Figure 1:
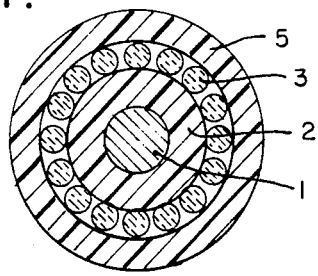

United States Patent [19]
Beal

[11] 4,141,622
[45] * Feb. 27, 1979

[54] OPTICAL GUIDES WITH FLEXIBLE CENTRAL REINFORCING MEMBERS

[75] Inventor: Richard E. Beal, Wigan, England

[73] Assignee: BICC Limited, London, England

[*] Notice: The portion of the term of this patent subsequent to Jul. 26, 1994, has been disclaimed.

[21] Appl. No.: 777,119

[22] Filed: Mar. 14, 1977

Related U.S. Application Data

[63] Continuation of Ser. No. 482,993, Jun. 25, 1974, Pat. No. 4,037,923.

[30] Foreign Application Priority Data

Jun. 28, 1973 [GB] United Kingdom ............... 30856/73

[51] Int. Cl.$^2$ ................................................. G02B 5/14
[52] U.S. Cl. ................................................. 350/96.23
[58] Field of Search ........................ 350/96 BR, 96.23

[56] References Cited
U.S. PATENT DOCUMENTS 4,037,923  7/1977  Beal .................................. 350/96 BR Primary Examiner—Jon W. Henry
Attorney, Agent, or Firm—Buell, Blenko & Ziesenheim

[57] ABSTRACT

An optical cable comprises a longitudinally extending flexible central reinforcing member, e.g. a steel wire or wires; a layer of compressible material, such as cellular rubber or cellular plastics material, surrounding the reinforcing member; a plurality of separate optical fibres stranded side by side about the central reinforcing member in such a way that each optical fibre is in contact with the layer of compressible material; and, surrounding the optical fibres, an outer protective sheath. When the separate optical fibres are subjected to a tensile force, at least some of them can move transversely inwardly of the cable to compress the compressible material and thereby reduce the strain that would otherwise be imparted to the fibres.

8 Claims, 3 Drawing Figures

OPTICAL GUIDES WITH FLEXIBLE CENTRAL REINFORCING MEMBERS

This is a continuation of my copending application Ser. No. 482,993, filed June 25, 1974, now U.S. Pat. No. 4,037,923.

This invention relates to optical guides for the transmission of the ultra-violet, visible and infra-red regions of the electromagnetic spectrum, which regions, for convenience, will hereinafter all be included in the generic term "light", and especially, but not exclusively, to optical waveguides for use in the communications field adapted for transmission of light having a wavelength within the range 0.8 to 1.1 micrometers.

For the purpose of transmitting light in an optical transmission system it has been proposed to employ optical guides including one or more than one optical fibre. Each optical fibre is usually of substantially circular cross-section but in some circumstances it may be of non-circular cross-section.

Optical guides with which the invention is concerned include guides including one or more than one optical fibre of a glass or other transparent material whose refractive index is arranged to decrease over at least a part of the radius of the fibre as the distance from the axis of the fibre increases and guides including one or more than one optical fibre of composite form comprising a core of transparent material clad throughout its length with another transparent material of lower refractive index which by total internal reflection of light being transmitted along the fibre or fibres confines at least a major proportion of the light within a core. A composite optical fibre is generally, but not necessarily, made of two glasses of different refractive indices, the glass forming the core having a higher refractive index than the glass forming the cladding. In another form of composite optical fibre the core may be made of a transparent liquid having a higher refractive index than that of the cladding.

The present invention has as its principal object the provision of an optical guide which by virtue of its construction at least substantially reduces the strain that would otherwise be imparted to the optical fibres of the guide if the guide should be stressed in such a way as to tend to subject each or any of the optical fibres to a tensile force.

According to the invention the optical cable comprises a longitudinally extending flexible central reinforcing member, a layer of compressible material surrounding the central reinforcing member, a plurality of separate optical fibres stranded side by side about the central reinforcing member in such a way that each optical fibre is in contact with the layer of compressible material and, surrounding the optical fibres, an outer protective sheath, the arrangement being such that when the separate optical fibres are subjected to a tensile force at least some of the optical fibres can move transversely inwardly of the cable to compress the compressible material and thereby reduce the strain that would otherwise be imparted to the fibres.

If desired, the plurality of separate optical fibres may be partially or wholly embedded in said layer of compressible material or a separate layer of compressible material may overlie and be in contact with the plurality of optical fibres.

Some or all of the separate optical fibres may each have a separate covering layer of compressible material.

A plurality of non-optical elongate elements may be assembled with the plurality of separate optical fibres about said layer of compressible material and, in a preferred embodiment, the separate optical fibres and non-optical elongate elements are stranded about with the elongate elements alternating with the optical fibres and with the optical fibres and elongate elements in contact with the layer of compressible material.

To provide for a limited degree of relative longitudinal movement between the optical fibres, the interstices between the fibres may be substantially filled with a greasy medium throughout the length of the cable.

The compressible material may be of any material that will be compressed when the optical fibres move transversely inwardly of the cable, but preferably it comprises cellular plastics material or cellular rubber.

When it is desired to permit some relative sliding movement between optical fibres and the compressible material, an appropriate slip agent may be incorporated in the compressible material or the compressible material may be impregnated or coated with a grease or suitable material.

The invention will be further illustrated by a description, by way of example, of three optical cables with reference to the accompanying diagrammatic drawings which show cross-sectional end views of the three cables, drawn on enlarged scales.

The optical cable shown in FIG. 1 comprises a reinforcing wire 1 of steel having a diameter of 1.0 mm, a layer 2 of cellular polyethylene of radial thickness of 0.5 mm surrounding the wire 1, a stranded layer of separate optical fibres 3, each of a diameter of 0.14 mm, and an outer protective sheath 5 of extruded polyethylene. The cable has an overall diameter of 4.5 mm.

Figure 2:
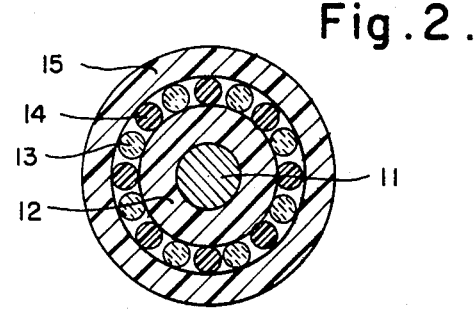

The optical cable shown in FIG. 2 has a reinforcing wire 11 of steel of diameter 1.0 mm, a layer of cellular 12 polyethylene having a radial thickness of 0.5 mm which surrounds the wire 11, a stranded layer comprising a plurality of separate optical fibres 13 and a plurality of elongate members 14 of plastics material, the optical fibres each having a diameter of 0.14 mm and the elongate members each having a diameter of 0.14 mm, and an outer protective sheath 15 of extruded polyethylene. The cable has an overall diameter of 4.5 mm.

In each of the optical cables shown in FIGS. 1 and 2 the interstices between the optical fibres may be filled with water-impermeable petroleum jelly throughout the length of the cable.

Figure 3:
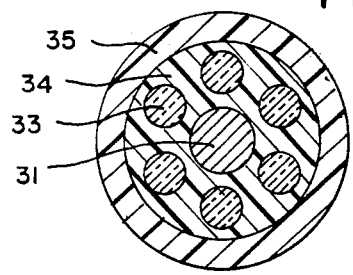

The third form of optical cable illustrated in FIG. 3 comprises a reinforcing wire 31 of steel having a diameter of 1.0 mm, a plurality of separate optical fibres 33 each having a diameter of 0.14 mm, an outer protective sheath 35 of extruded polyethylene and, filling the interstices between the optical fibres, between the optical fibres and the wire and between the optical fibres and the sheath throughout the length of the cable, cellular polyethylene 34. The cable has an overall diameter of 3.8 mm.

The optical guide of the present invention has the important advantage that if, during manufacture and installation of the guide, it is flexed to such an extent as to tend to subject each or any of the optical fibres to a tensile force, then the risk that fracture of optical fibres may occur is substantially reduced.

The provision of compressible material in the optical guide of the present invention has the additional advantage that it will absorb at least some of the transverse forces to which the guide may be subjected, thereby providing a degree of protection for the optical fibres against damage from this source.

What I claim as my invention is:

1. An optical cable comprising a longitudinally extending flexible central reinforcing member, a layer of compressible material surrounding the central reinforcing member, a plurality of separate optical fibres stranded side by side about the central reinforcing member in such a way that each optical fibre is in contact with the layer of compressible material and, surrounding the optical fibres, an outer protective sheath, the arrangement being such that when the separate optical fibres are subjected to a tensile force at least some of the optical fibres can move transversely inwardly of the cable to compress the compressible material and thereby reduce the strain that would otherwise be imparted to the fibres.

2. An optical cable as claimed in claim 1, wherein the plurality of separate optical fibres are each at least partially embedded in the layer of compressible material.

3. An optical cable comprising a longitudinally extending flexible central reinforcing member, a layer of compressible material surrounding the central reinforcing member, a plurality of optical fibres assembled about and in contact with the layer of compressible material and, surrounding the optical fibres, an outer protective sheath, the arrangement being such that when the optical fibres are subjected to a tensile force at least some of the optical fibres can move transversely inwardly of the cable to compress the compressible material and thereby reduce the strain that would otherwise be imparted to the fibres and wherein a separate layer of compressible material overlies and is in contact with the plurality of optical fibres.

4. An optical cable comprising a longitudinally extending flexible central reinforcing member, a layer of compressible material surrounding the central reinforcing member, a plurality of optical fibres assembled about and in contact with the layer of compressible material and, surrounding the optical fibres, an outer protective sheath, the arrangement being such that when the optical fibres are subjected to a tensile force at least some of the optical fibres can move transversely inwardly of the cable to compress the compressible material and thereby reduce the strain that would otherwise be imparted to the fibres and wherein a plurality of non-optical elongate elements is assembled with the plurality of optical fibres about the layer of compressible material.

5. An optical cable comprising a longitudinally extending flexible central reinforcing member, a layer of compressible material surrounding the central reinforcing member, a plurality of separate optical fibres and a plurality of non-optical elongate elements stranded about the central reinforcing member with the elongate elements alternating with the optical fibres and with the optical fibres and elongate elements in contact with the layer of compressible material and, surrounding the optical fibres and non-optical elongate elements, an outer protective sheath, the arrangement being such that when the separate optical fibres are subjected to a tensile force at least some of the optical fibres can move transversely inwardly of the cable to compress the compressible material and thereby reduce the strain that would otherwise be imparted to the fibres.

6. An optical cable comprising a longitudinally extending flexible central reinforcing member, a layer of compressible material surrounding the central reinforcing member, a plurality of optical fibres assembled about and in contact with the layer of compressible material and, surrounding the optical fibres, an outer protective sheath, the arrangement being such that when the optical fibres are subjected to a tensile force at least some of the optical fibres can move transversely inwardly of the cable to compress the compressible material and thereby reduce the strain that would otherwise be imparted to the fibres, said compressible material being selected from the group consisting of cellular plastics material and cellular rubber and said compressible material incorporating a slip agent in an amount sufficient to permit some relative sliding movement between optical fibres and the compressible cellular material.

7. An optical cable comprising a longitudinally extending flexible central reinforcing member, a layer of compressible material surrounding the central reinforcing member, a plurality of optical fibres assembled about and in contact with the layer of compressible material and, surrounding the optical fibres, an outer protective sheath, the arrangement being such that when the optical fibres are subjected to a tensile force at least some of the optical fibres can move transversely inwardly of the cable to compress the compressible material and thereby reduce the strain that would otherwise be imparted to the fibres, said compressible material being selected from the group consisting of cellular plastics material and cellular rubber and said compressible cellular material being impregnated with a grease that will permit some relative sliding movement between optical fibres and the compressible cellular material.

8. An optical cable comprising a longtitudinally extending flexible central reinforcing member, a layer of compressible material surrounding the central reinforcing member, a plurality of optical fibres assembled about and in contact with the layer of compressible material and, surrounding the optical fibres, an outer protective sheath, the arrangement being such that when the optical fibres are subjected to a tensile force at least some of the optical fibres can move transversely inwardly of the cable to compress the compressible material and thereby reduce the strain that would otherwise be imparted to the fibres and wherein interstices between the optical fibres are substantially filled with a greasy medium throughout the length of the cable.

* * * * *